May 29, 1956   M. COX ET AL   2,747,843
SEALS

Filed Aug. 28, 1952   3 Sheets-Sheet 1

Martin Cox
Raymond Kenneth Peter Stevens
Inventors

By
Stevens, Davis, Miller & Mosher
their Attorneys

May 29, 1956　　　　　M. COX ET AL　　　　　2,747,843
SEALS

Filed Aug. 28, 1952　　　　　　　　　　　　　3 Sheets-Sheet 3

United States Patent Office 2,747,843
Patented May 29, 1956

2,747,843

SEALS

Martin Cox, Cove, Farnborough, and Raymond Kenneth Peter Stevens, Farnham, England, assignors to Power Jets (Research and Development) Limited, London, England, a British company Application August 28, 1952, Serial No. 306,818

Claims priority, application Great Britain September 12, 1951

9 Claims. (Cl. 257—6)

In certain apparatus for operating with fluids at high pressures and including a casing and relatively movable members therein, one of which members is a partition between high and low pressure zones and the other is a member passing through the partition from one zone to the other, there is need for a seal between relatively moving faces of the partition and the other member. The two zones may be compartments or flow passages in the casing.

For example, there is need for such a seal in a regenerative heat exchanger with a movable member containing heat absorbing and heat transmitting material, where the partition divides a casing into passages for the hot fluid and for the cold fluid and the movable member is for example a rotor which rotates or oscillates in the casing so as to pass through the partition and across each fluid passage.

A similar seal is required, in a pressure exchanger. Usually the partition is stationary and carries the seal, which bears against the face of the movable member, but other arrangements are known. Thus the seal may be in either the partition or in the member engaged by the partition, either or both of which may rotate.

The present invention provides a sealing device which seals effectively without acting as a brake on the rotating member.

Figure 1:
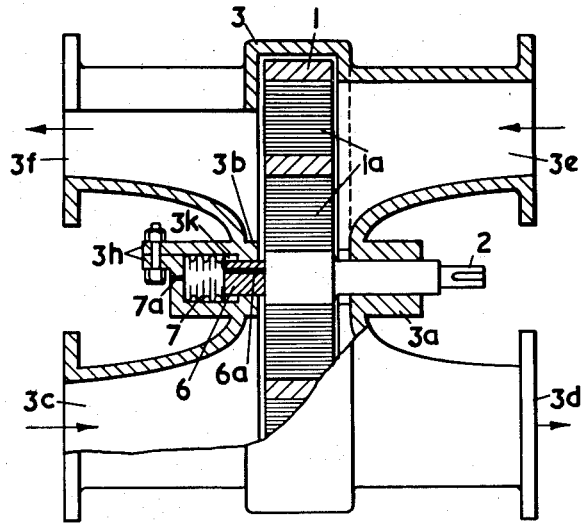
Figures 2, 3:
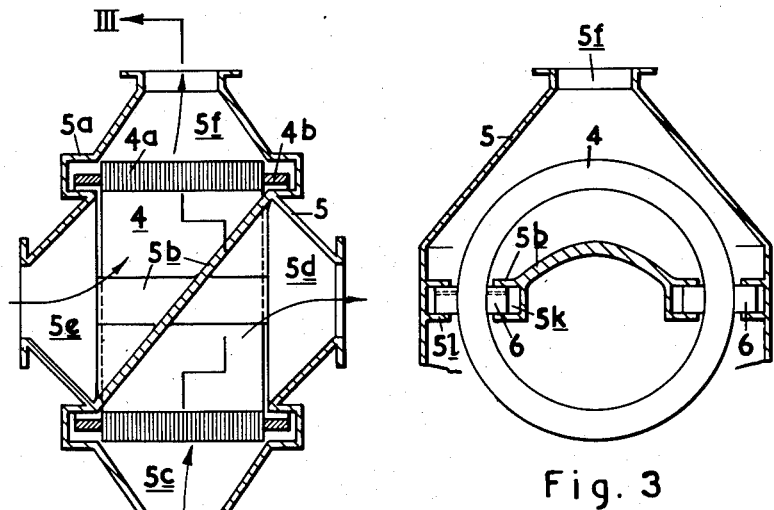
Figure 4:
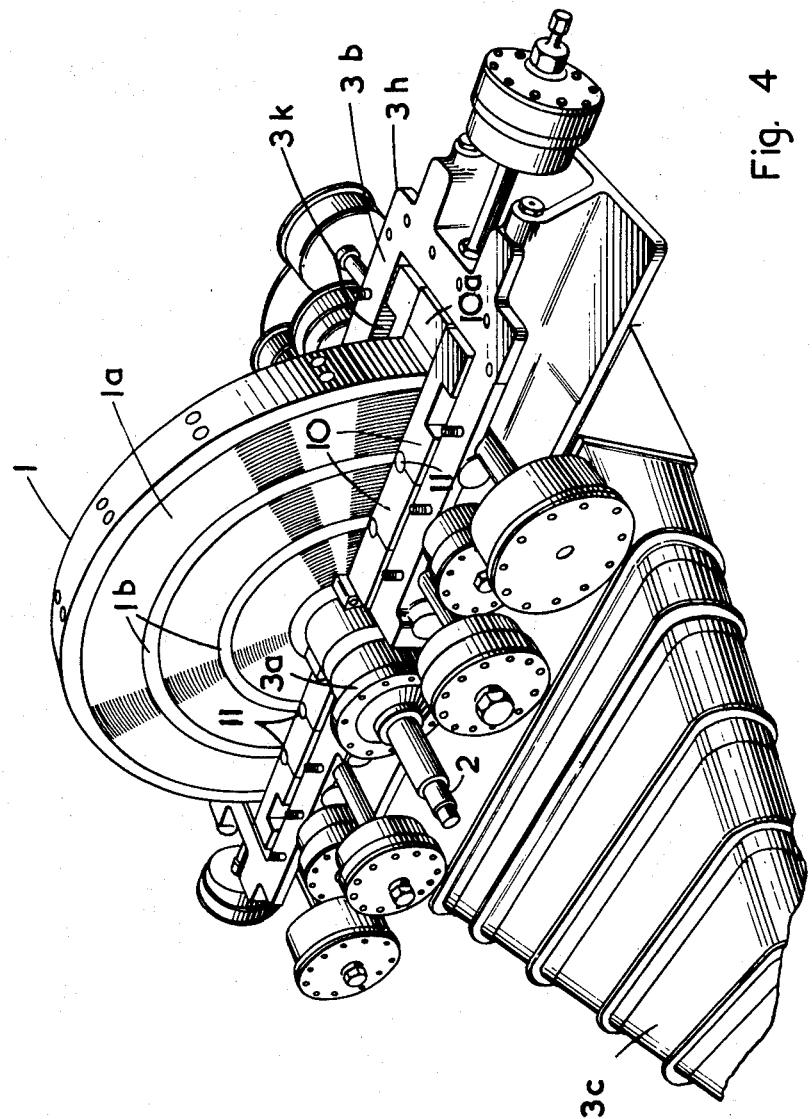
Figure 5:
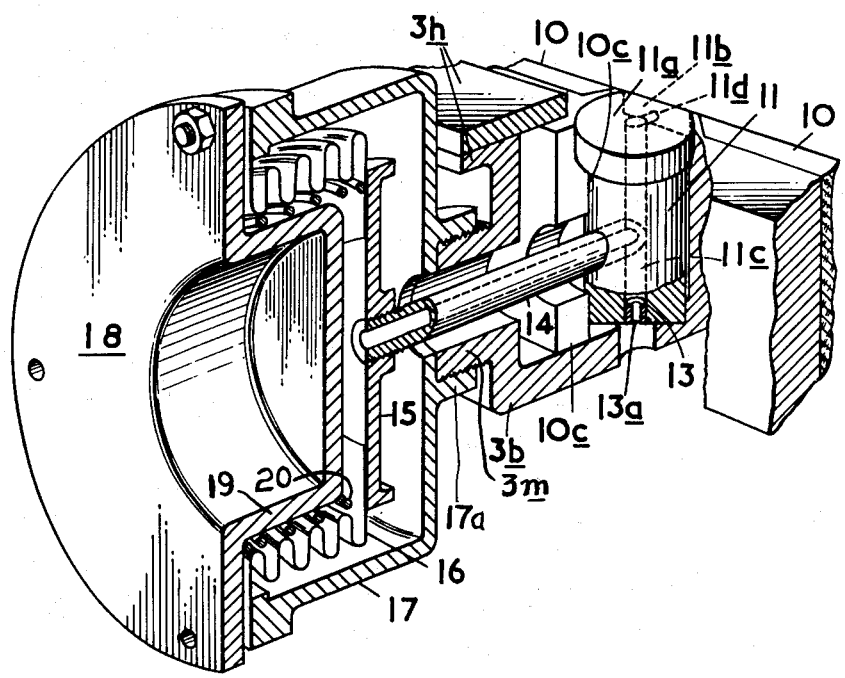

The invention is illustrated by the accompanying drawings, viz.:

Fig. 1 and Figs. 2 and 3, which are sectional views of two different types of rotary regenerative heat exchanger with seals to which the invention can be applied, Fig. 4, which is a more detailed perspective view of a heat exchanger according to Fig. 1, with an articulated seal, and Fig. 5 which is an enlarged sectional view of a seal according to the invention as incorporated in the exchanger of Fig. 4.

In Fig. 1 is shown an axial-flow type rotary regenerative heat exchanger. The rotor 1 therein is of the disc type and contains a heat-absorbing fluid-permeable matrix 1a which may for example be of the kind made up of plain and corrugated metal strips arranged alternately to one another to form a cellular structure. This rotor is mounted on a shaft 2 carried by bearings 3a in a casing 3 which is divided by a partition 3b into two fluid passages, one for a fluid at a high temperature and low pressure and the other for a fluid at low temperature and high pressure. The low pressure inlet to and outlet from the casing can be seen at 3c and 3d; the high pressure inlet and outlet can be seen at 3e and 3f. So that it can be assembled around the rotor, the casing 3 is divided into upper and lower halves with flanges 3h bolted together with a fluid-tight joint. A seal guide 3k is formed by a recess in the lower half of the casing. Seals 6 sliding in the guide 3k co-operate with the face of the rotor 1 to seal off the high-pressure zone in the upper passage from the low-pressure zone in the lower passage. The barrier and seals extend, of course, completely around the rotor—i. e. across both faces of the rotor on each side of the bearings and longitudinally around the ends. The figure is partly in section, along a rotor diameter and through a bearing in the right-hand half and in front of a diameter, in order to expose a seal, in the left-hand half.

In Figs. 2 and 3 is shown (in axial section and in section on III—III respectively) a radial flow type rotary regenerative heat exchanger. The rotor 4 therein is of drum type containing the usual matrix 4a and having an annular extension 4b at each end for bearings and driving means. This rotor is mounted in a casing 5 divided by a partition 5b—5l into high pressure and low pressure fluid passages, the low pressure inlet and outlet being shown at 5c and 5d and the high pressure inlet and outlet at 5e and 5f. The partition has a part 5b inside the rotor which has two straight portions lying longitudinally of the rotor joined by a curved portion extending obliquely across the rotor interior. The partition has also two straight portions 5l outside the rotor. Seal guides 5k are formed by channels in the straight portions of the partitions, and the seals 6 slide in these guides.

The devices so far described are both well-known types of heat-exchanger to which the present invention is applicable. It will be seen that in each case the partition 3b or 5b—5l divides the casing into high and low pressure zones and the member 1 or 4 passes through a gap in the partition. There is relative motion between the partition and the other member and a seal between the relatively moving faces. In order that the seal should not act as brake shoes on member 1 or 4 it is desirable that the seal be maintained just clear of the co-operating face without actual rubbing contact, and the invention provides means for achieving this.

Another type of a rotary regenerative heat exchanger with seals to which the improvement can be applied is shown in Figure 1. The seal 6 consists of a number of sliding blocks each having a portion sliding in the guide 3k after the fashion of a piston in a cylinder, fluid pressure in the cylinder acting on the rear of the seal to urge it towards the rotor face so that the combination constitutes an expansible chamber type of loading device for the seal. A bleed duct or leak 6a extends from the working face to the rear face of the seal 6 adjacent to the high pressure side. Thus fluid from the high pressure zone can leak into the chamber behind the seal at a rate dependent upon the running clearance between the seal and the co-operating face of the rotor. Another passage 7a, formed in the casing 3, constitutes a constant leak through which fluid in the chamber can leak away to atmosphere at a rate dependent upon the pressure in the chamber. Thus the space behind the seal is a control chamber determining the force acting on the seal in accordance with the running clearance. If the fluid leaking through be merely applied to the space behind the seal, to act on the rear face thereof, it has been found that leakage of high-pressure fluid between the rubbing faces of seal 6 and guide 3k as well as between adjacent blocks of a sub-divided seal builds up too high a pressure in the chamber and causes the seal to bear too heavily on the face of the rotor with consequent high wear.

Accordingly a metal bellows 7 inside the guide recess 3k is sealed to the casing 3 and to the blocks of the seal 6. The only entry to the chamber inside the bellows is through the leak 6a and pressure is kept to the correct value by leakage from the bellows through the leak 7a. Preferably there is a separate bellows, with one leak-in orifice and one leak-out orifice to each block.

It will be understood that the seal described can be used in the heat exchanger according to Figs. 2 and 3, and in general where such seals are required.

Fig. 4 is a more detailed view of a heat-exchanger as in Fig. 1, with the upper half of the casing 3 removed to expose the rotor 1 and the seal. In this figure can be seen also the other principal parts of Fig. 1—i. e. the shaft 2, the bearing 3a, the lower pressure inlet 3c and in particular the partition 3b with the lower flange 3h and the seal guide recess 3k in the partition. The seal however is articulated and consists of a number of separate sliding blocks 10 each of which is hinged to the next by a hinge pin 11 except the two blocks 10a sealing against the rotor rim. Each block is short compared to the length of the partition so that the seal is locally yieldable, to adjust itself to any thermal distortion of the rotor. Loading means are provided for urging each block 10 individually towards the rotor and preferably at least some of these are mounted on the hinge pins 11 as shown in Fig. 5.

The pin 11 as shown in Fig. 5 rests in fitting grooves 10b in the end faces of two adjacent blocks 10; each end face 10c is relieved to allow slight relative angular movement about the hinge pin 11. The latter has an enlargement at its upper end, nearest to the high pressure zone, forming a projection 11a with a small flat surface 11b directed towards the rotor face and lying in the same plane as the face of the seal when all the blocks 10 are aligned.

The pin 11 has an axial bore 11c closed at its upper end and open at the lower end through the small constant leak 13a in the plug 13. The leak-in orifice 11d extends from the surface 11b into the bore 11c. The high-pressure fluid flow through the orifice 11d is determined by the clearance between the face 11b and the rotor.

The pin 11 is connected by tubular piston rod 14 to the disc 15 to which is sealed the metal bellows 16 within the cup 17 of which the rear end is closed by the circular cover 18. The pressure within the bellows 16 acts on the disc 15 and through the rod 14 and hinge pin 11 applies the loading force to the seal. The cup 17 is mounted in correct alignment with the seal on the partition 3b behind the seal by screwed socket 17a on the cup screwed on to the hollow spigot 3m on the partition. The rod 14 passes through this spigot with clearance affording communication between the back of the guide 3k and the interior of the cup 17 so that any pressure built up due to leakage between seal and guide acts oppositely on the bellows and the back of the seal and so is balanced. The effective area of the bellows should be substantially equal to the corresponding effective area of the seal.

The bore 11c is the control chamber wherein the pressure controls the force on the seal. This chamber communicates with the interior of the bellows 16 through the rod 14, so that the control pressure tends to expand the bellows and apply force to the seal. The space inside the bellows 16 is kept of small capacity by the filling member 19 attached to the cover 18. A spring 20 between disc 15 and cover 18 combines with the springiness of the material of the bellows to give a basic minimum loading force on the seal.

Because of the nature of the surface of the rotor matrix 1a one or more rings 1b is arranged on the rotor in the usual way to present a smooth unbroken surface to the projection surface 11b of the pin 11.

The action is as follows: When the correct clearance is maintained, leakage through the clearance and into the control chamber 11c and the expansible chamber in bellows 16 by the leak-in 11d is equal to the leakage out through 13a and the combined effect of the pressure and the spring 20 is to maintain the right sealing pressure. On an increase in leakage through 11d due to an increase in the clearance, pressure is built up in the said chambers, thus increasing the force with which the bellows urge the rod 14 and the seal towards the rotor until the correct gap is restored. Similarly on a decrease of the leakage the pressure and force are reduced. The leak-out hole will be small and should be screened by a filter to avoid any tendency to choke.

It will be understood that the action depends upon the relation between the clearance gap and the pre-determined size of the leak-out hole. The force which can be applied to the bellows depends upon the available pressure difference; the rate of change in the force as the clearance between the face of the rotor and the face of the seal or the face of the projection on the hinge pin changes depends on the size of the leak-out hole and the ratio of the diameter thereof to the diameter of the leak-in-hole. With practical sizes of leak-out hole, the pressure difference actuating the bellows can vary over 70% of its full range with a variation in the clearance between the face of the rotor and the face of the seal or projection of from 1 to 3 thousands of an inch.

The practical advantage of the system is that, while the friction forces on the sealing units increase as the pressure ratio of the two fluids is raised, the pressure difference available for moving the units against these forces increases in the same proportion.

We claim:

1. In apparatus for operating with fluids at high pressures, and including a casing and relatively movable members therein, one of which is a partition separating high and low pressure zones and the other is a member which moves through said partition from one zone to the other, a sealing device comprising a seal mounted on one of said members and having a face co-acting with a relatively movable face of said other member to constitute a substantially fluid-tight seal, means defining a closed control chamber and a constant area leakage passage therefrom; means defining an opening into said chamber from one of said zones, variable in accordance with the clearance between said co-acting faces and means for applying to the seal a force urging said co-acting faces towards each other in accordance with the pressure in said control chamber.

2. A sealing device according to claim 1 wherein the means applying force to said seal is an expansible chamber device which constitutes at least part of said control chamber.

3. In apparatus for operating with fluids at high pressures, and including a casing and relatively movable members therein, one of which is a partition separating high and low pressure zones and the other is a member which moves through said partition from one zone to the other, an articulated sealing device comprising at least two seals mounted on one of said members and having a face co-acting with a relatively movable face of said other member to constitute a substantially fluid-tight seal, a hinge between said two seals, a hollow hinge pin in said hinge, means defining a constant area leakage vent from the interior of said hinge pin, further means defining an opening into the interior of said hinge pin from the said high pressure zone, variable in accordance with the clearance between said co-acting faces and means for applying to the hinge pin and hence to the seal a force urging said co-acting faces towards each other in accordance with the pressure in the interior of the hinge pin.

4. A sealing device according to claim 3 wherein said constant area vent is formed in the hinge pin itself and communicates with said low pressure zone.

5. A sealing device according to claim 3 wherein said hinge pin has a portion presenting a face substantially level with the said face of the seal, and perforated, adjacent to the high pressure zone, by said opening into the interior of the hinge pin.

6. A sealing device according to claim 5 including also an expansible chamber device constituting said means for applying force to the said hinge pin, and a tubular force-transmitting rod connecting said expansible chamber device to said hinge pin, the interior of said chamber being in communication with the interior of the hinge pin through said tubular rod.

7. In an apparatus belonging to the class which includes rotary regenerative heat exchangers, and comprising walls defining separate high and low pressure passageways, a rotor moving through one of said walls so as to lie partly in each of said passageways, a seal on said one wall, and an expansible chamber device urging a face of said seal into substantially fluid-tight sealing engagement with a co-acting face on said rotor, the provision of an inlet into said chamber from said high pressure passageway, variable in accordance with the clearance between said co-acting faces, and a constant area leakage vent from said chamber.

8. In an apparatus comprising a rotor and a stator which together define separate high and low pressure passageways, both extending through said stator and said rotor, a sealing device on said stator of which device at least one element has a face co-acting with a face of said rotor to constitute a substantially fluid-tight seal, a hollow expansible bellows, a hollow thrust-transmitting rod connecting said bellows to said element and having its interior communicating with the interior of said bellows, and provision firstly of a leakage outlet from the space constituted by the interiors of said rod and bellows and secondly in said face of said element, adjacent to the said high pressure passageway of an opening into said space proportioned to admit fluid into said space at the same rate as fluid leaks out, when there is a pre-determined small clearance between said co-acting faces.

9. In an apparatus comprising a rotor and a stator which together define separate high and low pressure passageways, both extending through said stator and said rotor, the combination comprising an articulated sealing device mounted on said stator, at least two slidable sealing blocks in said sealing device, each having a face co-acting with a face on said rotor to constitute a substantially fluid-tight seal, a hinge between said sealing blocks, a hollow hinge pin in said hinge presenting to said rotor face a face which firstly is substantially level with the said faces of the sealing blocks, and secondly is pierced by an opening affording leakage into the interior of the hinge pin, expansible-chamber means for urging said seal-block faces towards said rotor face, a hollow tubular thrust rod connecting said expansible-chamber means to said hinge pin, the interior of said rod being in communication with the interiors of said expansible chamber and said hinge pin to form with them a common fluid-receiving space, means defining a leakage vent from said common space, means on said stator constituting a substantially fluid-tight guiding enclosure for said slidable sealing blocks and defining a leakage-receiving space behind said blocks, a casing mounted on said stator and enveloping said expansible-chamber means, and means defining a communication between the interior of said casing and said leakage-receiving space to form with them a second common space wherein a face on the rear of each said sealing block and an opposed external face of said expansible-chamber device are exposed to the pressure of leakage fluid in said second common space acting on them equally in opposite senses.

References Cited in the file of this patent
UNITED STATES PATENTS

| | | |
|---|---|---|
| 2,195,877 | Steedman | Apr. 2, 1940 |
| 2,465,526 | Goddard | Mar. 29, 1949 |
| 2,579,211 | Stevens | Dec. 18, 1951 |
| 2,584,513 | Summers | Feb. 5, 1952 |
| 2,631,870 | Hodson | Mar. 17, 1953 |
| 2,678,193 | Stevens et al. | May 11, 1954 |